United States Patent
Masters et al.

(10) Patent No.: US 8,878,931 B2
(45) Date of Patent: Nov. 4, 2014

(54) SYSTEMS AND METHODS FOR MANAGING VIDEO DATA

(75) Inventors: Amy Masters, Artarmon (AU); Ajit Bhandari, Toongabbie (AU); Dae-Soon Kwon, North Ryde (AU); Sally-Anne Palmer, Artarmon (AU)

(73) Assignee: Honeywell International Inc., Morristown, NJ (US)

( * ) Notice: Subject to any disclaimer, the term of this patent is extended or adjusted under 35 U.S.C. 154(b) by 471 days.

(21) Appl. No.: 13/254,434

(22) PCT Filed: Mar. 4, 2010

(86) PCT No.: PCT/AU2010/000247

§ 371 (c)(1),
(2), (4) Date: Nov. 18, 2011

(87) PCT Pub. No.: WO2010/099575

PCT Pub. Date: Sep. 10, 2010

(65) Prior Publication Data

US 2012/0092510 A1    Apr. 19, 2012

(30) Foreign Application Priority Data

Mar. 4, 2009    (AU) .............................. 2009900943

(51) Int. Cl.
*H04N 7/18*    (2006.01)
*H04N 5/247*    (2006.01)
*H04N 21/218*    (2011.01)

(52) U.S. Cl.
CPC .............. *H04N 7/181* (2013.01); *H04N 5/247* (2013.01); *H04N 21/21805* (2013.01)
USPC ....................................................... 348/143

(58) Field of Classification Search
CPC .............................. H04N 7/181; H04N 7/183
USPC ....................................................... 348/143
See application file for complete search history.

(56) References Cited

U.S. PATENT DOCUMENTS 3,753,232 A    8/1973 Sporer
3,806,911 A    4/1974 Pripusich
(Continued)

FOREIGN PATENT DOCUMENTS

CA    2240881    12/1999
CN    1265762    9/2000
(Continued)

OTHER PUBLICATIONS

Hampapur et al., "Smart Surveillance: Applications, Technologies and Implications", Information, Communications and Signal Processing, 2003 and the Fourth Pacific Rim Conference on Multimedia, Proceedings of the 2003 Joint Conference of the Fourth International Conference, Dec. 15-18, 2003, pp. 1133-1138.

(Continued)

*Primary Examiner* — Chikaodili E Anyikire
(74) *Attorney, Agent, or Firm* — Seager Tufte & Wickhem LLC.

(57) ABSTRACT

Described herein are systems and methods for managing video data. In overview, various embodiments provide software, hardware and methodologies associated with the management of video data. In overview, a distributed DVM system includes a plurality of discrete DVM systems, which may be geographically or notionally distributed. Each discrete DVM system includes a respective central DVM database server thereby to provide autonomy to the discrete system. This server supports one or more camera servers, these camera servers in turn each being configured to make available live video data from one or more cameras. Each system additionally includes one or more clients, which provide a user interface for displaying video data (such as video data from one of the cameras). The discrete DVM systems are primarily linked by way of a centralized database server/database server communications interface. However, the clients are configured to connect directly to camera servers belonging to their local DVM system or a remote DVM system in the distributed architecture.

19 Claims, 6 Drawing Sheets

(56) References Cited

U.S. PATENT DOCUMENTS

| | | |
|---|---|---|
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,521,841 A | 5/1996 | Arman et al. |
| 5,526,871 A | 6/1996 | Musser et al. |
| 5,541,585 A | 7/1996 | Duhame et al. |
| 5,591,950 A | 1/1997 | Imedio-Ocana |
| 5,596,994 A | 1/1997 | Bro |
| 5,604,804 A | 2/1997 | Micali |
| 5,610,982 A | 3/1997 | Micali |
| 5,631,825 A | 5/1997 | van Weele et al. |
| 5,634,008 A | 5/1997 | Gaffaney et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,708,767 A | 1/1998 | Yeo et al. |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,751,336 A | 5/1998 | Aggarwal et al. |
| 5,778,256 A | 7/1998 | Darbee |
| 5,793,868 A | 8/1998 | Micali |
| 5,821,945 A | 10/1998 | Yeo et al. |
| 5,828,809 A | 10/1998 | Chang et al. |
| 5,914,875 A | 6/1999 | Monta et al. |
| 5,915,473 A | 6/1999 | Ganesh et al. |
| 5,927,398 A | 7/1999 | Maciulewicz |
| 5,930,773 A | 7/1999 | Crooks et al. |
| 5,960,083 A | 9/1999 | Micali |
| 5,969,755 A | 10/1999 | Courtney |
| 5,973,613 A | 10/1999 | Reis et al. |
| 5,974,235 A | 10/1999 | Nunally et al. |
| 6,018,359 A | 1/2000 | Kermode et al. |
| 6,072,402 A | 6/2000 | Kniffin et al. |
| 6,091,821 A | 7/2000 | Buer |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,181,867 B1 | 1/2001 | Kenner et al. |
| 6,222,532 B1 | 4/2001 | Ceccarelli |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,359,647 B1 | 3/2002 | Sengupta et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,400,890 B1 | 6/2002 | Nagasaka et al. |
| 6,424,068 B2 | 7/2002 | Nakagashi |
| 6,424,370 B1 | 7/2002 | Courtney |
| 6,445,409 B1 | 9/2002 | Ito et al. |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,570,608 B1 | 5/2003 | Tserng |
| 6,574,537 B2 | 6/2003 | Kipersztok et al. |
| 6,587,637 B2 | 7/2003 | Nagasaka et al. |
| 6,604,023 B1 | 8/2003 | Brown et al. |
| 6,615,594 B2 | 9/2003 | Jayanth et al. |
| 6,628,835 B1 | 9/2003 | Brill et al. |
| 6,628,997 B1 | 9/2003 | Fox et al. |
| 6,643,387 B1 | 11/2003 | Sethuraman et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,721,454 B1 | 4/2004 | Qian et al. |
| 6,724,915 B1 | 4/2004 | Toklu et al. |
| 6,741,915 B2 | 5/2004 | Poth |
| 6,744,968 B1 | 6/2004 | Imai et al. |
| 6,754,389 B1 | 6/2004 | Dimitrova et al. |
| 6,758,051 B2 | 7/2004 | Jayanth et al. |
| 6,766,450 B2 | 7/2004 | Micali |
| 6,779,027 B1 | 8/2004 | Schunicht et al. |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,845,357 B2 | 1/2005 | Shetty et al. |
| 6,851,621 B1 | 2/2005 | Wacker et al. |
| 6,871,193 B1 | 3/2005 | Campbell et al. |
| 6,879,709 B2 | 4/2005 | Tian et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,940,474 B2 | 9/2005 | Weitbruch et al. |
| 6,940,998 B2 | 9/2005 | Garoutte |
| 6,948,082 B2 | 9/2005 | Gschwind et al. |
| 6,967,612 B1 | 11/2005 | Gorman et al. |
| 6,969,542 B2 | 11/2005 | Klasen-Memmer et al. |
| 6,970,070 B2 | 11/2005 | Juels et al. |

(56) References Cited

U.S. PATENT DOCUMENTS

| | | |
|---|---|---|
| 6,970,640 B2 | 11/2005 | Green et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,020,336 B2 | 3/2006 | Cohen-Solal et al. |
| 7,032,114 B1 | 4/2006 | Moran |
| 7,046,731 B2 | 5/2006 | Wu et al. |
| 7,055,759 B2 | 6/2006 | Wacker et al. |
| 7,068,842 B2 | 6/2006 | Liang et al. |
| 7,076,102 B2 | 7/2006 | Lin et al. |
| 7,106,885 B2 | 9/2006 | Osterweil et al. |
| 7,110,569 B2 | 9/2006 | Brodsky et al. |
| 7,124,943 B2 | 10/2006 | Quan et al. |
| 7,130,719 B2 | 10/2006 | Ehlers et al. |
| 7,159,234 B1 | 1/2007 | Murphy et al. |
| 7,183,894 B2 | 2/2007 | Yui et al. |
| 7,194,110 B2 | 3/2007 | Qian |
| 7,200,266 B2 | 4/2007 | Ozer et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,227,569 B2 | 6/2007 | Maruya |
| 7,228,055 B2 | 6/2007 | Murakami et al. |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,295,673 B2 | 11/2007 | Grab et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,346,186 B2 | 3/2008 | Sharoni et al. |
| 7,352,952 B2 | 4/2008 | Herberger et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,469,343 B2 | 12/2008 | Ray et al. |
| 7,469,363 B2 | 12/2008 | Meis et al. |
| 7,505,914 B2 | 3/2009 | McCall |
| 7,542,867 B2 | 6/2009 | Steger et al. |
| 7,570,867 B2 | 8/2009 | Barrett et al. |
| 7,574,734 B2 | 8/2009 | Fedronic et al. |
| 7,586,398 B2 | 9/2009 | Huang et al. |
| 7,600,679 B2 | 10/2009 | Kshirsagar et al. |
| 7,661,603 B2 | 2/2010 | Yoon et al. |
| 7,735,145 B2 | 6/2010 | Kuehnel et al. |
| 7,796,536 B2 | 9/2010 | Roy et al. |
| 7,818,026 B2 | 10/2010 | Hartikainen et al. |
| 7,853,987 B2 | 12/2010 | Balasubramanian et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 8,045,960 B2 | 10/2011 | Orakkan |
| 8,095,889 B2 | 1/2012 | DeBlaey et al. |
| 2001/0010541 A1 | 8/2001 | Fernandez et al. |
| 2002/0011923 A1 | 1/2002 | Cunningham et al. |
| 2002/0022991 A1 | 2/2002 | Sharood et al. |
| 2002/0046337 A1 | 4/2002 | Micali |
| 2002/0107949 A1 | 8/2002 | Rawson, III |
| 2002/0118096 A1 | 8/2002 | Hoyos et al. |
| 2002/0121961 A1 | 9/2002 | Huff |
| 2002/0165824 A1 | 11/2002 | Micali |
| 2003/0033230 A1 | 2/2003 | McCall |
| 2003/0051026 A1 | 3/2003 | Carter et al. |
| 2003/0053659 A1 | 3/2003 | Pavlidis et al. |
| 2003/0067387 A1 | 4/2003 | Kwon et al. |
| 2003/0123703 A1 | 7/2003 | Pavlidis et al. |
| 2003/0126293 A1 | 7/2003 | Bushey |
| 2003/0133614 A1 | 7/2003 | Robins et al. |
| 2003/0156824 A1 | 8/2003 | Lu |
| 2003/0174049 A1 | 9/2003 | Beigel et al. |
| 2003/0208689 A1 | 11/2003 | Garza |
| 2003/0233432 A1 | 12/2003 | Davis et al. |
| 2004/0062421 A1 | 4/2004 | Jakubowski et al. |
| 2004/0062525 A1 | 4/2004 | Hasegawa et al. |
| 2004/0064453 A1 | 4/2004 | Ruiz et al. |
| 2004/0080615 A1 | 4/2004 | Klein et al. |
| 2004/0087362 A1 | 5/2004 | Beavers |
| 2004/0130620 A1 | 7/2004 | Buehler et al. |
| 2004/0205350 A1 | 10/2004 | Waterhouse et al. |
| 2004/0252193 A1 | 12/2004 | Higgins |
| 2004/0263621 A1 | 12/2004 | Guo et al. |
| 2005/0008198 A1 | 1/2005 | Guo et al. |
| 2005/0046703 A1 | 3/2005 | Gutler |
| 2005/0138380 A1 | 6/2005 | Fedronic et al. |
| 2006/0045185 A1 | 3/2006 | Kiryati et al. |
| 2006/0059557 A1 | 3/2006 | Markham et al. |
| 2006/0064731 A1 | 3/2006 | Kahle et al. |
| 2006/0206748 A1* | 9/2006 | Li ..................................... 714/4 |
| 2006/0215752 A1 | 9/2006 | Lee et al. |
| 2006/0215753 A1 | 9/2006 | Lee et al. |
| 2006/0238616 A1 | 10/2006 | Curtner et al. |
| 2006/0239645 A1 | 10/2006 | Curtner et al. |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0086758 A1 | 4/2008 | Chowdhury et al. |
| 2008/0087663 A1 | 4/2008 | Mansbery et al. |
| 2008/0173709 A1 | 7/2008 | Ghosh |
| 2008/0272881 A1 | 11/2008 | Goel |
| 2009/0018900 A1 | 1/2009 | Waldron et al. |
| 2009/0080443 A1 | 3/2009 | Dziadosz |
| 2009/0086692 A1 | 4/2009 | Chen |
| 2009/0121830 A1 | 5/2009 | Dziadosz |
| 2009/0167485 A1 | 7/2009 | Birchbauer et al. |
| 2009/0168695 A1 | 7/2009 | Johar et al. |
| 2009/0258643 A1 | 10/2009 | McGuffin |
| 2009/0266885 A1 | 10/2009 | Marcinowski et al. |
| 2009/0292524 A1 | 11/2009 | Anne et al. |
| 2009/0292995 A1 | 11/2009 | Anne et al. |
| 2009/0292996 A1 | 11/2009 | Anne et al. |
| 2009/0328152 A1 | 12/2009 | Thomas et al. |
| 2009/0328203 A1 | 12/2009 | Haas |
| 2010/0036511 A1 | 2/2010 | Dongare |
| 2010/0148918 A1 | 6/2010 | Gerner et al. |
| 2010/0164720 A1 | 7/2010 | Kore |
| 2010/0269173 A1 | 10/2010 | Srinivasa et al. |
| 2011/0038278 A1 | 2/2011 | Bhandari et al. |
| 2011/0071929 A1 | 3/2011 | Morrison |
| 2011/0110643 A1 | 5/2011 | Chandra |
| 2011/0115602 A1 | 5/2011 | Bhandari et al. |
| 2011/0133884 A1 | 6/2011 | Kumar et al. |
| 2011/0153791 A1 | 6/2011 | Jones et al. |
| 2011/0167488 A1 | 7/2011 | Roy et al. |
| 2011/0181414 A1 | 7/2011 | G et al. |
| 2012/0096131 A1 | 4/2012 | Bhandari et al. |
| 2012/0106915 A1 | 5/2012 | Palmer |
| 2012/0121229 A1 | 5/2012 | Lee |
| 2012/0133482 A1 | 5/2012 | Bhandari et al. |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1259076 | 11/2002 |
| EP | 1339028 | 8/2003 |

(56) References Cited

FOREIGN PATENT DOCUMENTS

| | | |
|---|---|---|
| EP | 1403817 | 3/2004 |
| EP | 1630639 | 3/2006 |
| GB | 2251266 | 7/1992 |
| GB | 2390705 | 1/2004 |
| JP | 6019911 | 1/1994 |
| JP | 2000276577 | 10/2000 |
| JP | 2003/074942 | 3/2003 |
| JP | 2003/240318 | 8/2003 |
| JP | 2005295255 | 10/2005 |
| KR | 20040073069 | 8/2004 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 01/63576 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/126974 | 11/2006 |
| WO | 2007000637 A1 | 1/2007 |
| WO | WO 2007/043798 | 4/2007 |
| WO | WO 2008/045918 | 4/2008 |
| WO | 2008092202 | 8/2008 |
| WO | WO 2008/144803 | 12/2008 |
| WO | 2009158365 | 12/2009 |
| WO | WO 2010/039598 | 4/2010 |
| WO | WO 2010/106474 | 9/2010 |
| WO | 2011003131 | 1/2011 |

OTHER PUBLICATIONS

International Search Report, PCT/AU2008/000107, Mar. 28, 2008.
"Certificate Validation Choices," CoreStreet, Inc., 8 pages, 2002.
"CoreStreet Cuts the PKI Gordian Knot," Digital ID World, pp. 22-25, Jun./Jul. 2004.
"Distributed Certificate Validation," CoreStreet, Ltd. 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Keyfast Technical Overview", Corestreet Ltd., 21 pages, 2004.
"Manageable Secure Physical Access," Corestreet Ltd, 3 pages, 2002.
"MiniCRL Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
U.S. Appl. No. 13/533,334, filed Jun. 26, 2012.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
Lipton et al., "Critical Asset Protection, Perimeter Monitoring, and Threat Detection Using Automated Video Surveillance," Article on Objectvideo.com, 11 pages, printed Sep. 2004.
Lipton, "ObjectVideo Forensics: Activity-Based Video Indexing and Retrieval for Physical Security Application," Article on Objectvideo.com, 11 pages, printed Sep. 2004.
Medioni et al., "Event Detection and Analysis from Video Streams," IEEE Transactions on Pattern Analysis and Machine Intelligence, vol. 23, No. 8, pp. 873-889, Aug. 2001.
Mills et al., "A Magnifier Tool for Video Data," Proceedings of the Conference on Human Factors in Computing Systems, pp. 93-98, May 3, 1992.
Porikli et al., "Event Detection by Eigenvector Decomposition Using Object and Frame Features," IEEE, 10 pages, 2004.
Smoliar et al., "Content-Based Video Indexing and Retrieval," IEEE MultiMedia No. 2, pp. 62-72, 1994.

\* cited by examiner

SYSTEMS AND METHODS FOR MANAGING VIDEO DATA

This application is a 371 of International Application PCT/AU2010/000247 filed Mar. 4, 2010.

FIELD OF THE INVENTION

The present invention relates to systems and methods for managing video data. Embodiments of the invention have been particularly developed for managing access to live and/or recorded video data between distributed Digital Video Management (DVM) systems. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Digital Video Management (DVM) systems are widely used. In overview, a plurality of cameras are assigned to a plurality camera servers, with each camera server being configured to make available (for live viewing or recording purposes) video data from an assigned one or more cameras. The camera servers are all centrally managed by a DVM database server. In general terms, a client wishing to view live video data from a given one of the cameras provides a request to the DVM database server, and is informed which camera server makes available video data for that camera. The client then opens a connection with that camera server, and streams the live video data for local viewing.

There is an inherent limitation on the number of cameras that can be supported by a single DVM system. This leads to complications in terms of scalability. Furthermore, various situations arise where geographically dispersed sites require local autonomy but also central monitoring. Bandwidth between such sites presents a limiting factor to constrain the manner in which video data and/or other data is shared.

There is a need in the art for improved systems and methods for managing video data.

SUMMARY OF THE INVENTION

It is an object of the present invention to overcome or ameliorate at least one of the disadvantages of the prior art, or to provide a useful alternative.

One embodiment provides a DVM system including:

one or more local cameras, one or more local camera servers, each having a respective one or more assigned local cameras, the local camera servers being configured to make available, to DVM clients, video data from their respective one or more assigned local cameras;

a local DVM database server that maintains data indicative of the local cameras and local camera servers, wherein the local DVM database server is in communication with a remote DVM database server for a remote DVM system, wherein the remote DVM system includes:

one or more remote cameras, and one or more remote camera servers, each having a respective one or more assigned remote cameras, the remote camera servers being configured to make available, to DVM clients, video data from their respective one or more assigned remote cameras; and a local client in communication with the local DVM database server, the local client being configured for displaying live video data to a user, wherein the local client is configured to communicate with a local camera server for displaying video data from one of its respective one or more assigned local cameras, and configured to communicate with a remote camera server for displaying video data from one of its respective one or more assigned remote cameras.

One embodiment provides a method for operating a client in a local DVM system, the method including the steps of:

receiving a user command to display live video data from a predetermined camera;

identifying, based on data maintained by the local DVM system, details for a camera server that is configured for providing live video data for the predetermined camera;

in the case that the camera server is part of a remote DVM system, providing to the camera server a request to view live video data from the predetermined camera, wherein the request is provided over a TCP/IP connection between the client and the camera server;

receiving from the camera server the live video data via the TCP/IP connection between the client and the camera server; and displaying the live video data.

One embodiment provides a method for operating a local camera server in a local DVM system, the method including the steps of:

receiving, from a remote client in a remote DVM system, via a TCP/IP connection between the remote client and the local camera server, a request to display live video data from a predetermined camera;

identifying credentials for the client; and in the case that the identified credentials match locally stored pre-approved credentials, providing the live video data to the client via the TCP/IP connection between the remote client and the local camera server.

One embodiment provides a computer program product for performing a method as described herein.

One embodiment provides a carrier medium for carrying computer executable code that, when executed on a processor, allows the processor to perform a method as described herein.

One embodiment provides a system configured for performing a method as described herein.

One embodiment provides a distributed DVM system including:

a first DVM system including one or more first-system cameras, one or more first-system camera servers, each having a respective one or more assigned first-system cameras, the first-system camera servers being configured to make available video data from their respective one or more assigned first-system cameras to DVM clients, a first-system DVM database server that maintains data indicative of the first-system cameras and first-system camera servers, and one or more first-system clients for displaying video data to users; and a second DVM system including one or more second-system cameras, one or more second-system camera servers, each having a respective one or more assigned second-system cameras, the second-system camera servers being configured to make available video data from their respective one or more assigned second-system cameras to DVM clients, a second-system DVM database server that maintains data indicative of the second-system cameras and second-system camera servers, and one or more second-system clients for displaying video data to users.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing video data. In overview, various embodiments provide software, hardware and methodologies associated with the management of video data. In overview, a distributed DVM system includes a plurality of discrete DVM systems, which may be geographically or notionally distributed. Each discrete DVM system includes a respective central DVM database server thereby to provide autonomy to the discrete system. This server supports one or more camera servers, these camera servers in turn each being configured to make available live video data from one or more cameras. Each system additionally includes one or more clients, which provide a user interface for displaying video data (such as video data from one of the cameras). The discrete DVM systems are primarily linked by way of a centralized database server/database server communications interface. However, the clients are configured to connect directly to camera servers belonging to their local DVM system or a remote DVM system in the distributed architecture.

System Level Overview—Single System

Figure 1:
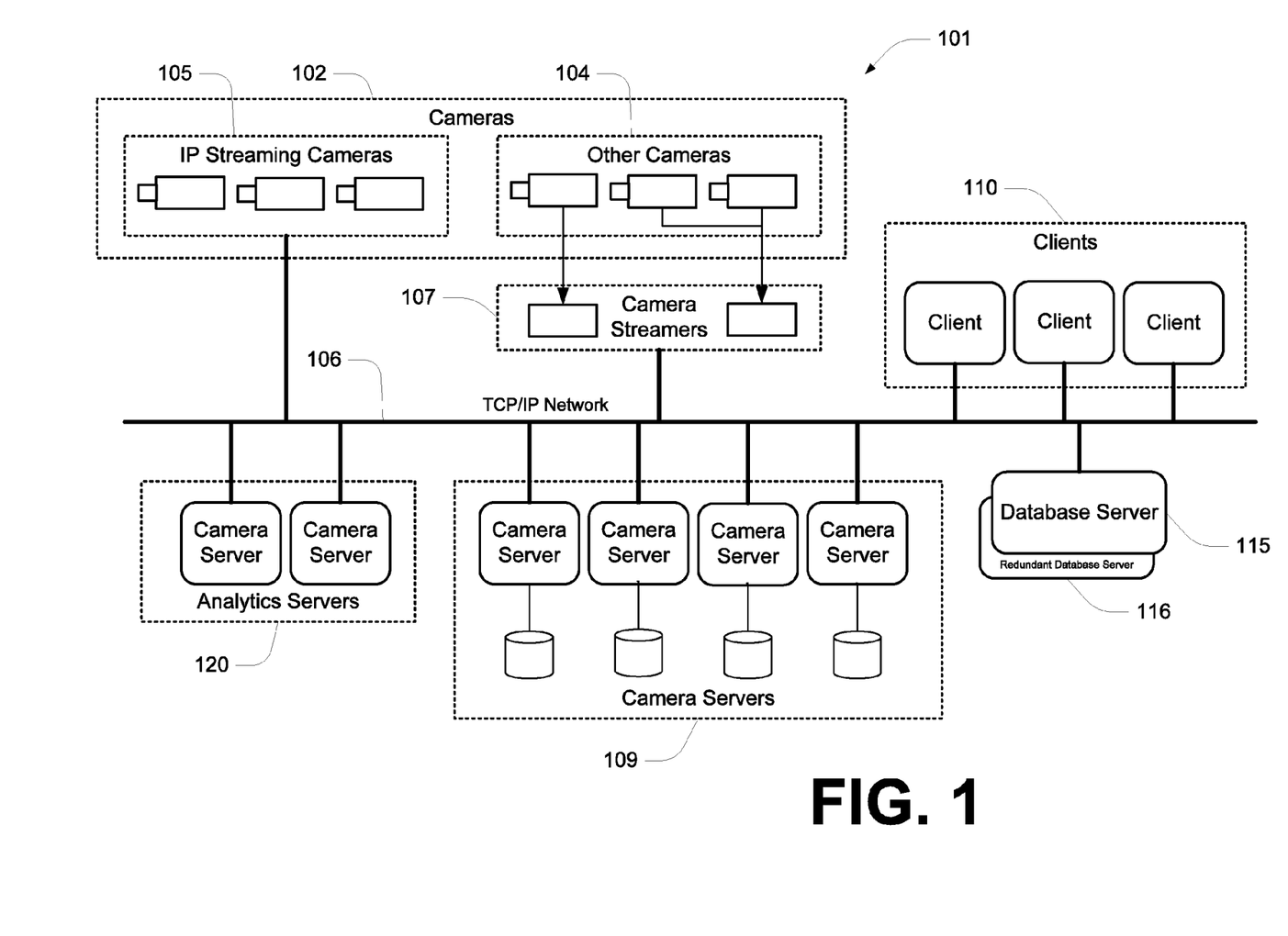
FIG. 1 schematically illustrates a discrete DVM system according to one embodiment.

FIG. 1 illustrates a general Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system. In practice, many systems omit one or more of these features, and/or include additional features.

System 101 includes a plurality of cameras 102. Cameras 102 include conventional cameras 104 (including analogue video cameras), and IP streaming cameras 105. Cameras 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a camera streamer 107 is required to convert a captured video signal into a format suitable for IP streaming. A plurality of cameras 104 can be connected to a single streamer 107, however it is preferable to have the streamer in close proximity to the camera, and as such multiple streamers are often used.

One or more camera servers 109 are also connected to network 106 (these may be either physical servers or virtual servers). Each camera server is enabled to have assigned to it one or more of cameras 102. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the camera encoder to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras being assigned to a common camera server, this is a conceptual notion, and is essentially no different from a camera server being assigned to one or more cameras.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Distributed System Architecture

Embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture).

Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

Figure 2:
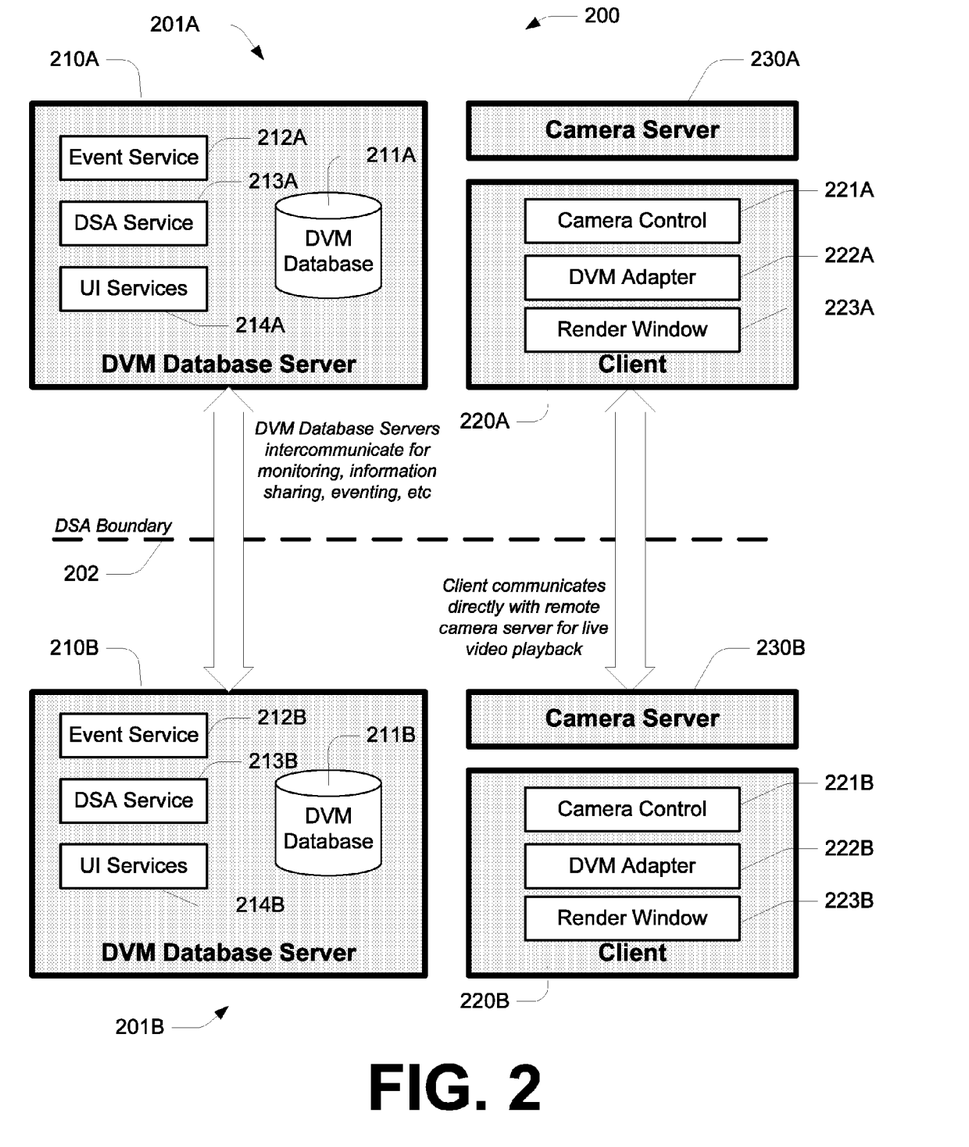
FIG. 2 schematically illustrates a distributed DVM system according to one embodiment, including two individual discrete DVM systems.

FIG. 2 provides a relatively simple schematic representation of a distributed DVM system 200. A limited selection of components is illustrated to provide for simplicity, whilst allowing an appreciation of some key functionalities.

System 200 includes a first DVM system 201A and a second DVM system 201B. These discrete systems are separated by a distributed system architecture (DSA) boundary 202. Boundary 202 is, to some extent, notional only. In the present embodiment, communication across boundary 202 is realized via a TCP/IP connection, although other system-system communications links are used to provide TCP/IP communications channels in other embodiments. In some embodiments the DVM systems are on a common domain, for example in the context of an Intranet arrangement. However, the present embodiments are not limited to any particular network arrangement, and are in some cases implemented over the Internet in a general sense.

System 201A includes a DVM database server 210A. Server 210A operates in conjunction with a DVM database 211A, which maintains data indicative of cameras and camera servers in both system 201A and system 201B. The manner by which inter-system information sharing is configured is discussed further below. An event service component 212A is responsible for publishing events in system 201A. For example, component 212A is informed of various activities, such as modifications to database records, and publishes events accordingly (for example in one embodiment various components in the system are configured to monitor such happenings and inform component 212A). Other components take action responsive to the publication of events. A DSA service component 213A is responsible for managing communications with system 201B, via a TCP/IP connection with a corresponding component in system 201B. A UI services component 214A is responsible for allowing a client to interface with DVM database 211A, for example in the context of an object oriented software architecture (for example using IIS Web Services in a .NET software framework). That is, UI services component 214A operates in conjunction with a repository of business objects which provide for various software functionalities, and allow for the construction and/or population of UI components in a client machine.

System 201A additionally includes a client 220A, being defined by a client machine such as a personal computer, or being defined by a software application executing on a client machine, depending on perspective. Client 220A provides a render window component 221A, which is configured for rendering and displaying video data. A DVM adapter component 222A is configured to obtain video data from a camera sever, based on the location of video data requested by a user, and information contained in database 211A, which reveals the location of the camera server that makes available the video data requested by the user. A camera control component 223A provides UI components for allowing a user to control a physical camera, for example in terms of pan, tilt and zoom.

System 201A additionally includes a camera server 230A, which is configured for making available live video data from one or more cameras (not shown), and optionally for making available stored video data from one or more storage locations in system 201A.

System 201B presently includes the same components as system 201A, and these are allocated corresponding reference numerals, with a "B" suffix rather than an "A" suffix. For example, system 201A includes a server 210A, whereas system 201B includes a server 210B, and so on. In later examples, system 201A is referred to as system A, and system 201B as system B.

By virtue of having their own respective database servers 210A and 210B, systems 201A and 201B are able to function autonomously. That is, they are discrete systems, and do not depend on one another to function. This is contrasted with a situation where a single database server manages geographically distributed camera servers, cameras and clients. That is simply a single system. The present embodiments, on the other hand, are two systems, and gain advantages stemming from that (for example support of a greater number of cameras, etc).

The connection between servers 210A and 210B is fundamental in implementing the present distributed architecture. In particular, it allows the two discrete systems to discover and connect to one another, share information via synchronization of various aspects of data in their respective databases (such as camera/camera server information), and additionally allows the passing of event information between the systems (for example allowing an event occurring in one system, such as detection of motion at a given camera, to have effect in the other system, for example by launching a view on a client in that system). Servers 210A and 210B communicate via one or more TCP sockets ports and/or one or more WCF ports.

It has been recognized by the present inventors that centralized communication between database servers, in itself, is not able to sustain an appropriate degree of inter-system communication to provide effective distributed system architecture. In this regard, a decision was made to configure client 220A to connect directly to camera server 230B for the purposes of obtaining live video data, and also for recorded video data. Likewise, client 220B is able to connect directly to camera server 230A (although this is not shown for the sake of simplicity). This allows for a substantially seamless integration of remote camera servers with a local system, as the mechanism by which a camera server is addressed (via TCP/IP communications) is generally the same for both local and remote variants. Furthermore, resource-intensive video data able to be shared directly between the client and camera server, rather than having to pass between the database servers across boundary 202. This is significant in reducing latency, and improving the effectiveness of the connection between the database servers (by reducing resource intensive traffic between those servers).

Figure 3:
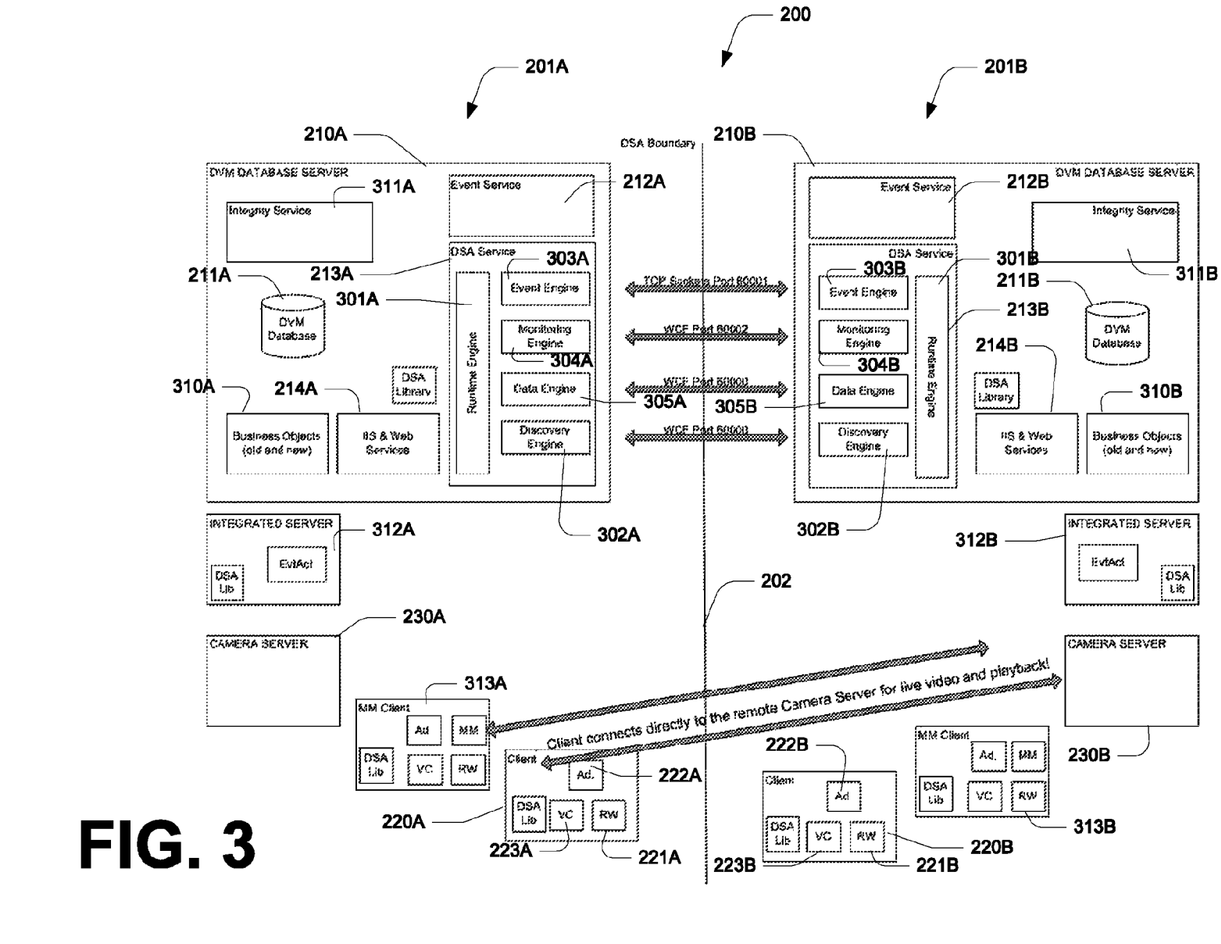
FIG. 3 schematically illustrates a distributed DVM system according to one embodiment, including two individual discrete DVM systems.

FIG. 3 illustrates a distributed system architecture according to a further embodiment. Various components are common with system 200, and corresponding reference numerals are used. A brief over view of some of the components follows. In terms of the DSA service 213A:

A DSA runtime engine 301A provides a central point for the overall distributed architecture, providing the local system with a view to the distributed architecture. That is, when a local system communicates with a DSA service, it will only interact with interfaces exposed by the DSA runtime engine.

A DSA discovery engine 302A listens to requests from remote systems, or makes requests to remote systems. This occurs in terms of creating links between systems, modifying links between systems, or destroying links between systems.

A DSA event engine 303A is responsible for the flow of events (being object model events) between distributed systems. As context, one embodiment provides for a process flow whereby various components inform local event service 212A of an event which needs to be published, the event service publishes messages to all object models in the system, and the object model is then responsible for taking pertinent actions and broadcasting such events to any registered clients. Event engine 303 is responsible for converting object model events into a DSA-transportable format, and vice versa. That is, it receives data indicative of a local event and translates that for delivery to remote sites in a DSA transportable format, or receives from a remote site data in a DSA-transportable format, and converts that to publish a local event. In some embodiments events are grouped and transported between the distributed systems in bulk, optionally at predefined times (for example periodically at a rate of between every 1 to 60 seconds) as configured by a system administrator. In this embodiment engine 303A communicates with a local event service 212A outside of the DSA service: it receives from that service data indicative of local events, and provides to that service data indicative of remote events for publication in the local system. The communication between service 212A and engine 303A is not necessarily direct; in one embodiment the object model receives raw data from local event service 212A, and performs processing on that data before delivering information to event engine 303A.

A DSA monitoring engine 304A monitors the link between systems. In one embodiment, this makes use of heartbeat messaging. In one embodiment, a local monitoring agent is provided in respect of each remote site with which the local site communicates in the context of a distributed system architecture. This adds flexibility to the architecture, as each communication link is optionally individually configured with specific settings, for example in terms of the time between passing each heartbeat message.

A DSA data engine 305A is responsible for requesting and servicing requests for information across DSA boundary 202. This includes a listening component and dispatching component, respectively for receiving and providing requests for information between distributed systems. One example is fetching video recordings information for a camera at a remote system. As described further below, recorded video data is transferred by a local client/remote camera server link, but there is an initial step whereby the details of recorded data, for example the unique identifiers for individual video recordings occurring in a particular time period, for a remote camera known to the local system are identified via inter-system communication via engine 304A (and 304B).

FIG. 3 also depicts business objects 310A for interfacing a user with the database in conjunction with UI services 214A, an integrity service 311A for monitoring local system health, an integrated server 312A (such as a building management server) and a multi monitor client 313A, which is configured for displaying video data from multiple camera services at a given point in time.

Various aspects and functionalities of the distributed system architectures are discussed in more detail further below by reference to specific embodiments.

DSA Initial Configuration

Figure 4:
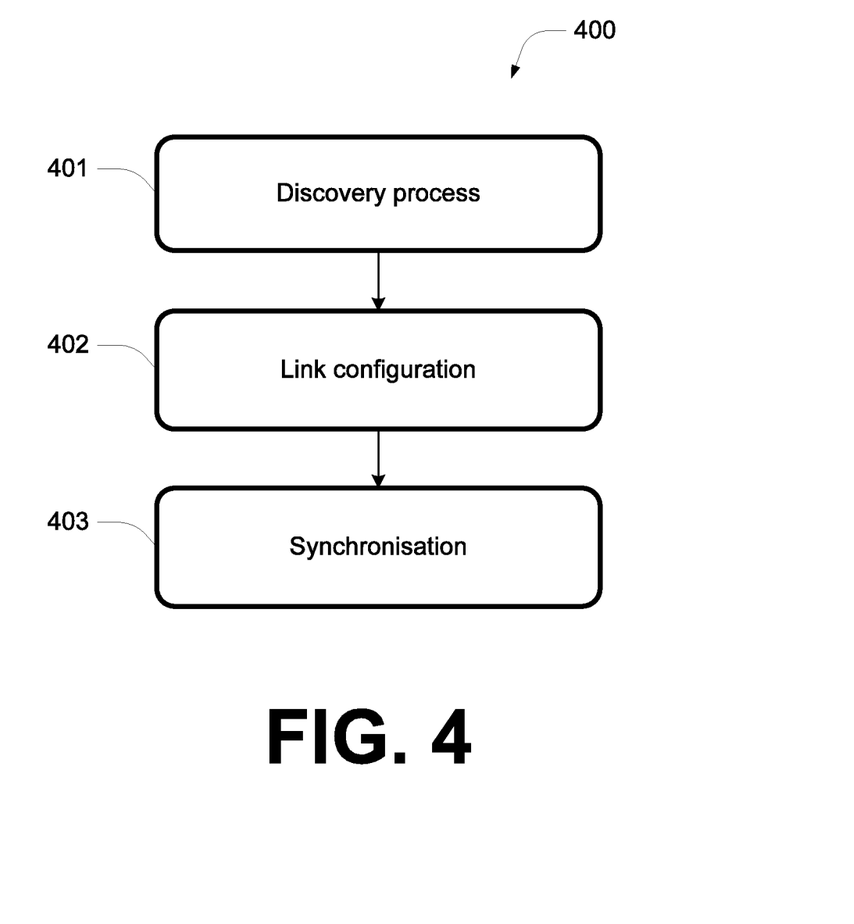
FIG. 4 illustrates a method according to one embodiment.

FIG. 4 illustrates an exemplary method 400 for initial configuration of a distributed system architecture according to one embodiment.

At step 401, one system discovers another system, via messaging between DSA services components. As part of this, the respective DSA services compare credentials to verify that a link is allowable, for example in the context of security considerations. In one embodiment the creation of a link is only allowable where the DVM systems have been installed to run under the same administrative account/password.

Although the term "discovery" is used, this should not be read to necessarily imply automated "discovery", for instance in the sense of plug-and-play functionality or the like. In some embodiments discovery is a manual process based on system-system requests.

The results of the discovery process indicate to the requestor system (i.e. the system initiating discovery) the suitability of joining with the other system in a distributed system architecture. That is, if the other end of the link is in fact contactable (and if the remote system of an appropriate system version to allow communications, and security/credential requirements are satisfied) the link can be configured and saved.

At step 402 a user inputs various aspects of information about the nature of the link, if required. For example, this information may affect the data to be synchronized in the following step. Details of the link are then written to the local database, and a cache of links updated. Then, at step 403, synchronization occurs. In one embodiment, this includes obtaining a snapshot of required data from the remote system, updating the local database with information regarding remote cameras and servers, and updating the local event engine and monitor engine based on the new link.

Inter-System Event Management

Figure 5:
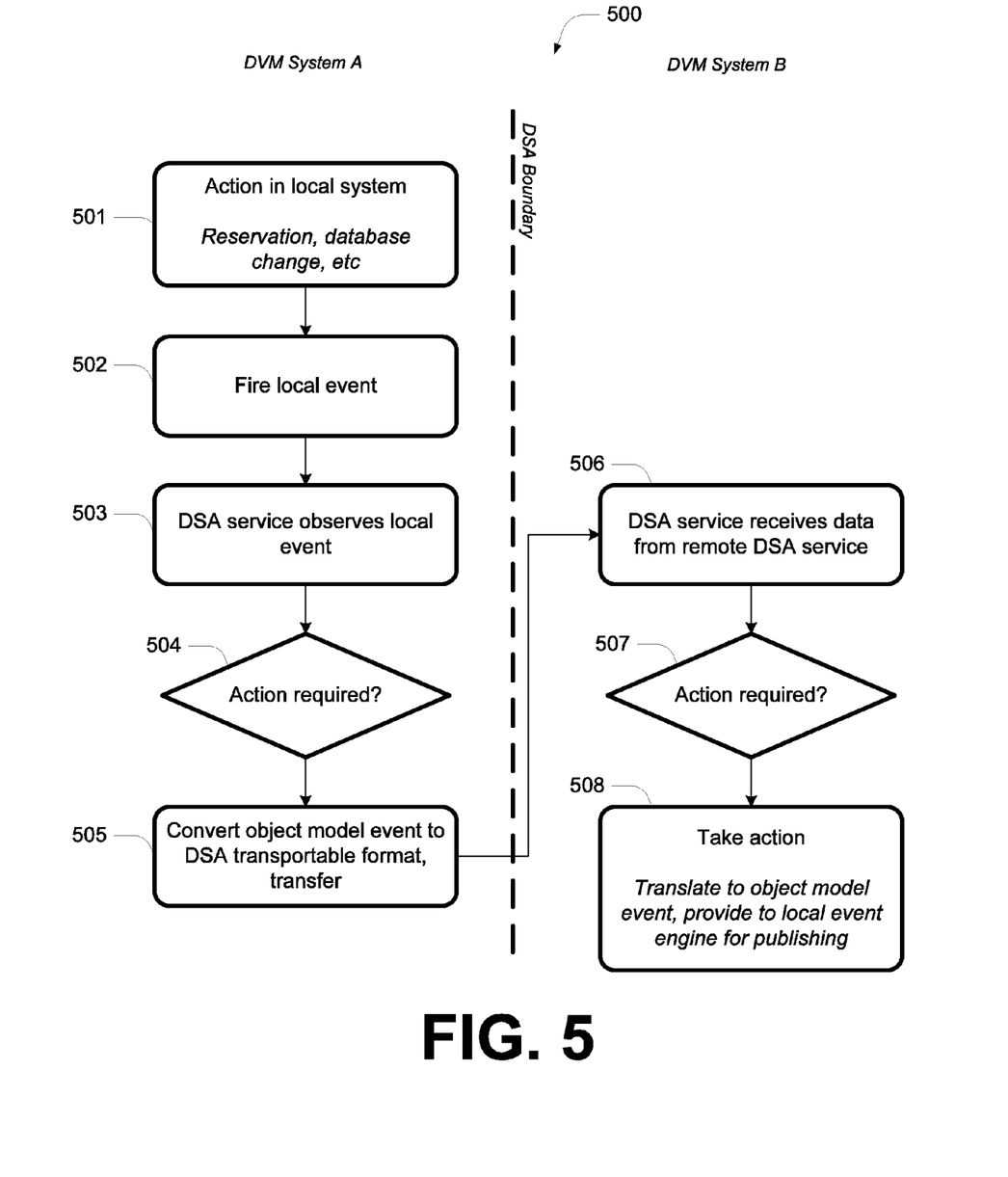
FIG. 5 illustrates a method according to one embodiment.

FIG. 5 illustrates a method 500 for managing events between distributed DVM systems according to one embodiment. This is described by reference to a method in a DVM system A and a DVM system B. This is exemplary only, and there may be a greater number of discrete systems in the overall distributed architecture.

At step 501, there is a local action in DVM system A, for example in terms of a camera reservation being made (as discussed further below), a modification to camera or system configuration settings, or the like. At step 502, a local event service is notified of this action and is responsible for firing a local event in the local system. The DSA service observes this local event at 503, and determines at 504 whether that event should be provided to the remote system (system B). For example, the DSA service is configured to recognize various events as being of interest to the remote system, which is in some cases due to manual user configuration of the distributed architecture. In the case that the event should be provided to the remote system, the DSA service converts the local (object model) event into a DSA transportable format, and transports it across the DSA boundary. The DSA service in system B receives the resulting data at 506, and assuming it recognizes it as requiring a local event (based on decision 507), takes action. In very general terms, this includes arranging for a local event to be raised. More specifically, in one embodiment the remote system receives the events in DSA-transportable format. It then unformats and parses the events, notifying the local event service of the particular events to be raised and the particular parameters with which those events are to be raised. The event service then converts this data and sends a message to each local DVM object model. Each local object model then processes and broadcasts an actual object model event to all its clients.

Examples of events that are transported across the DSA boundary include:

Camera/camera server status changes, such as reassignment of cameras between camera servers, cameras/camera servers going online or offline, and so on. It will be appreciated that, due to the direct communications between clients and remote camera servers, it is important that up-to-date remote camera/camera server information needs to be maintained in the local system. In one embodiment, a change in camera number or the like results in a local event, which causes a partial data push of the affected data to the remote system for updating the remote database (thereby to maintain the synchronization of step 403) as well as the delivery of an object model event to the remote system.

Analytics information, such as motion detection information. In this regard, motion detection events often have an impact for clients. For example, in some cases a client is configured to respond to events indicative of motion detection at a predetermined camera, for example to provide a notification and/or launch a view from that camera (optionally within a multi-camera view).

Camera reservation information. In the present embodiment, when a client connects to a camera server for obtaining live video data for a particular camera, the client receives a time-limited reservation over that camera. This gives the client control over the camera for that time (for example in terms of pan/tilt/zoom) in preference to other clients (although in some embodiments a client with a higher access right is able to take control at any time regardless of such a reservation). Reservation information is displayed in a client UI, and as such the reservation of a remote camera needs to be communicated to a local client, this occurring via the server-server event management process. For example, a local client connects to a remote camera server directly to obtain live video data from a given camera, and receives live video data from the remote camera server directly. An event indicative of the reservation publishes in the remote system, and filters to the local system and client via a method such as method 500.

It will be appreciated that this is a small selection of events, provided for the sake of explanation only. Various other events are present in practical implementations.

Local Client to Remote Camera Server Interaction

As noted above, a local client wishing to view live video data from a remote camera server does so via direct communications with the remote camera server. An example of this is provided through method 600 of FIG. 6. This method is again described by reference to exemplary DVM systems A and B.

Figure 6:
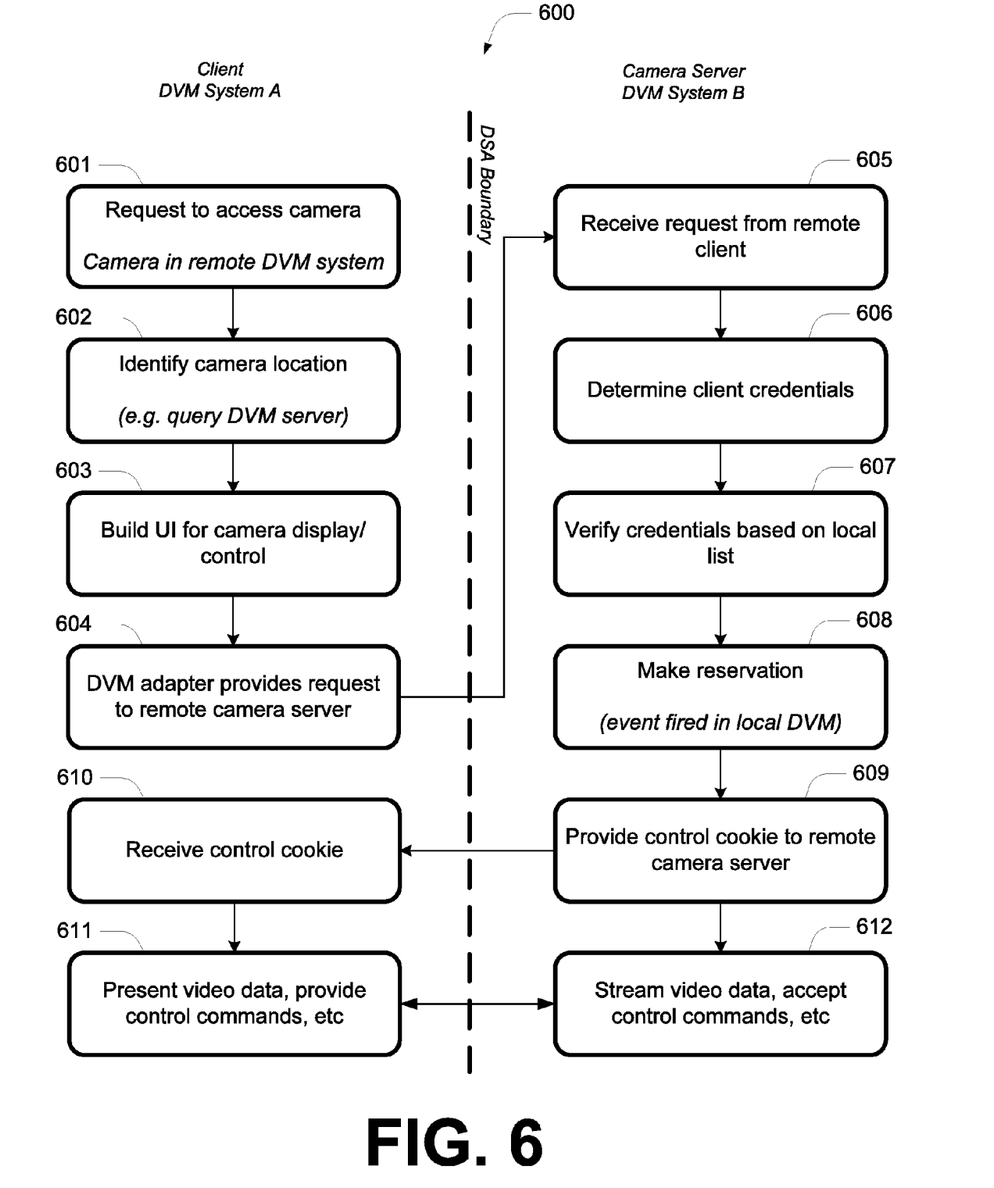
FIG. 6 illustrates a method according to one embodiment.

At step 601, a client receives from a user data indicative of a request to view live video data from a specified camera. For the sake of the present example, it is assumed that the specified camera is provided within a DVM system remote of that in which the client operates. That is, in a distributed DVM architecture, the client is considered to be local as opposed to a remote camera server. Step 601 may come about, for instance, as a result of a user input, or as a result of an automated process.

At step 602, the client identifies the location of the specified camera. In the present embodiment this is achieved by submitting a request to the local DVM database server which, as noted above, maintains data indicative of remote cameras and camera servers. This data allows the client to contact the relevant camera server directly. The client then, at 603, invokes relevant UI components for viewing the relevant live video data. For example, following the example of FIG. 2, these include render window component 221A, which is configured for rendering and displaying video data, DVM adapter component 222A configured to obtain video data from a camera sever, and camera control component 223A for allowing a user to control the selected camera, for example in terms of pan, tilt and zoom (with these commands being provided via the DVM adapter). In the present embodiment these are built based on business objects and UI services component 214A, for example using a .NET framework. That is, the UI services component uses a .NET Framework. The individual UI components, such as the render window and DVM adapter and camera control components, are in the present embodiment C++ COM objects.

At step 604, the client provides a request, via the DVM adapter, to the remote camera server. This request is received in the remote camera server at 605. Step 606 includes determining client credentials, which in the present embodiment is achieved based on analyzing the context of the request to determine information about the client/user. That is, the client does not transmit explicit credential information for the present purposes (although that does occur in other embodiments). At 607, the camera server verifies the client credentials based on local (system B) data. In the present embodiment, this data is maintained at the camera server, and furthermore is indicative of Windows-based users and/or groups who have appropriate access rights for the present purposes. Other embodiments adopt different approaches, including the use of credential information stored maintained at the local database of system B.

Assuming credentials were verified successfully (and that there are no other bars to the client viewing live video data from the relevant camera, such as camera failure or the like), the camera server grants reservation to the relevant client at 608. This fires a local event, and in turn results in a remote event, with data indicative of the reservation filtering back to the client UI via the server-server link, such that the user is able to view information regarding the reservation (for example time remaining). However, independent of that process, the camera server provides directly to the client a "control cookie", which is effectively a token that allows subsequent communications, at least within the scope of the reservation, to proceed without a need to repeatedly verify credentials. The control cookie is received at step 610. The method then progresses to steps 611 and 612, which respectively describe the process by which the client provides requests (for live video data and/or camera control) and the process by which the camera server receives and progresses those requests (and delivers live video data to the client and/or provides control instructions to the camera).

In terms of reservations, a client may still view live video data during another client's reservation; control functionality is however prevented. In some embodiments a prioritization protocol is implemented such that certain users are able to gain control in spite of other users' reservations, for example based on access permissions or scope of responsibility.

In the present embodiment, the client component of method 600 remains generally unchanged regardless of whether the camera server is local or remote. In this manner, the user experience is generally seamless regardless of whether cameras are located locally or remotely.

In spite of the generally seamless experience, it will be appreciated that the bandwidth of link between distributed systems might affect the quality of live video data from a remote system. Some embodiments make use of client side frame rate management for these purposes. In particular, when requesting live video data, the client specifies how that live video data should be delivered, for example in terms of frame skipping (e.g. "deliver only every second frame"), and the camera server delivers the data accordingly. In other embodiments throttling of data is managed centrally by a component that monitors bandwidth resources of the system-system link, and instructs for reduced bandwidth video transfers where predefined conditions are met.

In terms of recorded video data, in the present embodiments there is an additional preliminary step where the client requests to the local sever to identify the location of that recorded video data. If that data is remote, the local server communicates with the remote server (e.g. via a data engine described in relation to FIG. 3) to retrieve the unique identifiers for discrete video recordings on the camera in question. These unique identifiers include, for example, the start date and time of the video recording, and a numeric video recording id used for connection purposes. Method 600 then continues generally as described above, although it is recorded video data being obtained/presented, rather than live video data. In some embodiments, a recording is created by a camera while that camera is connected to one camera server, and then later that camera is moved such that it becomes managed by another camera server. In such an instance, to retrieve the resulting video recording, the local client will still always attempt an initial connection to the camera server which is currently managing the camera. If that camera server has no knowledge of the requested recording (e.g. because the recording was created while the camera was previously managed by a different camera server), then the current camera server will look up the location of the recording and will return the alternate camera server connection details to the client. The client then retries its request for the video recording by connecting to this alternate camera server.

Conclusions and Interpretation

It will be appreciated that the disclosure above provides various significant systems and methods for managing video data. For example, the present embodiments allow for a distributed system architecture in the context of DVM systems, and does so in a manner that efficiently manages concerns associated with the transfer of bandwidth intensive video data.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A first Digital Video Management (DVM) system comprising:
   one or more first-system cameras,
   one or more first-system camera servers, each having a respective one or more assigned first-system cameras, the first-system camera servers being configured to make available, to DVM clients, video data from their respective one or more assigned first-system cameras;
   a first-system DVM database server that maintains data indicative of the first-system cameras and first-system camera servers, wherein the first-system DVM database server is configured to enable a first-system client to access video data from the one or more first-system cameras via the first-system camera servers;
   wherein the first-system DVM database server is configured to communicate with a second-system DVM database server for a second DVM system remote of the first DVM system, wherein the second DVM system comprises:
      one or more second-system cameras distinct from the one or more first-system cameras, and
      one or more second-system camera servers distinct from the one or more first-system camera servers, each having a respective one or more assigned second-system cameras, the second-system camera servers being configured to make available, to DVM clients, video data from their respective one or more assigned second-system cameras;
      the second-system DVM database server, distinct from the first-system DVM database server, maintains data indicative of the second-system cameras and second-system camera servers, wherein the second-system DVM database server is configured to enable a second-system client to access video data from the one or more second-system cameras via the second-system camera servers; and
   a first-system client in communication with the first-system DVM database server, the first-system client being configured for displaying live video data to a user, wherein the first-system client is configured to communicate with a first-system camera server for displaying video data from one of its respective one or more assigned first-system cameras, and configured to communicate with a second-system camera server for displaying video data from one of its respective one or more assigned second-system cameras;
   wherein the first-system DVM database server and second-system DVM database server each execute a respective DSA event engine, wherein the first-system DSA event engine is configured to:
      monitor object model events in the first DVM system;
      for predefined categories of monitored object model events, define DSA transportable data indicative of those events, and communicate the DSA transportable data to the second DVM system; and
      receive DSA transportable data from the second DVM system, and process that data thereby to publish a local object model event based on a second-system object model event based upon which the received DSA transportable data is defined.

2. A DVM system according to claim 1 wherein the first-system DVM database server maintains data indicative of the second-system cameras and the second-system camera servers.

3. A DVM system according to claim 1 wherein the second-system DVM system includes a second-system client, the second-system client being configured for displaying live video data to a user, wherein the second-system client is configured to communicate with a second-system camera server for displaying video data from one of its respective one or more assigned second-system cameras, and configured to communicate with a first-system camera server for displaying video data from one of its respective one or more assigned first-system cameras.

4. A DVM system according to claim 1 wherein the first-system DVM database server receives from the second-system database server data indicative of a second-system event, and in response triggers a first-system event.

5. A DVM system according to claim 1 wherein the first-system DVM database server is configured to provide to the second-system DVM database server data indicative of a first-system event, such that the second-system database server in response triggers an event in the second DVM system.

6. A method for operating a client in a first Digital Video Management (DVM) system, the method comprising:
   receiving a user command to display live video data from a predetermined camera;
   identifying, based on data maintained by the first DVM system, details for a camera server that is configured for providing live video data for the predetermined camera;

in the case that the camera server is part of a second DVM system, providing to the camera server a request to view live video data from the predetermined camera, wherein the request is provided over a TCP/IP connection between the client and the camera server;

receiving from the camera server the live video data via the TCP/IP connection between the client and the camera server;

displaying the live video data;

wherein the first DVM system and second DVM system each execute a respective DSA event engine, wherein the first-system DSA event engine is configured to:

monitor object model events in the first DVM system;

for predefined categories of monitored object model events, define DSA transportable data indicative of those events, and communicate the DSA transportable data to the second DVM system; and receive DSA transportable data from the second DVM system, and process that data thereby to publish a local object model event based on a second-system object model event based upon which the received DSA transportable data is defined.

7. A method according to claim 6 comprising:

generating UI components for displaying the live video data and one or more aspects of information regarding the predetermined camera, wherein at least one of the aspects of information regarding the predetermined camera is obtained from a DVM database server of the first DVM system, wherein the information is received by the DVM database server of the first DVM system from a DVM database server of the second DVM system.

8. A method according to claim 6 comprising:

providing UI control components for controlling the predetermined camera, wherein in response to input provided to the UI control components control signals are provided to the camera server via the TCP/IP connection between the client and the camera server.

9. A method according to claim 6 wherein the request to view live video data from the predetermined camera is indicative of first-system-specified video parameters.

10. A method according to claim 9 wherein the first-system-specified video parameters include frame rate.

11. A method for operating a first-system camera server in a first Digital Video Management (DVM) system, the method comprising:

receiving, from a second-system client in a second DVM system, via a TCP/IP connection between the second-system client and the first-system camera server, a request to display live video data from a predetermined camera;

identifying credentials for the client; and in the case that the identified credentials match first-system stored pre-approved credentials, providing the live video data to the client via the TCP/IP connection between the second-system client and the first-system camera server;

wherein the first DVM system and the second DVM system each execute a respective DSA event engine, wherein the first-system DSA event engine is configured to:

monitor object model events in the first DVM system;

for predefined categories of monitored object model events, define DSA transportable data indicative of those events, and communicate the DSA transportable data to the second DVM system; and receive DSA transportable data from the second DVM system, and process that data thereby to publish a local object model event based on a second-system object model event based upon which the received DSA transportable data is defined.

12. A method according to claim 11 wherein the credentials are identified based on the context of the request to display live video data received from the second-system client.

13. A method according to claim 11 further comprising:

in the case that the identified credentials match first-system stored pre-approved credentials, additionally making a reservation of the camera on behalf of the second-system client, wherein data indicative of the reservation propagates to the second DVM system by way of communications between a DVM database server of the first DVM system and a DVM database server of the second DVM system.

14. A method according to claim 11 further comprising:

in the case that the identified credentials match first-system stored pre-approved credentials, providing to the second-system client a token indicative of an access permission, wherein the second-system client is able to control the camera during a period defined by the token.

15. A method according to claim 11 further comprising:

in the case that the identified credentials match first-system stored pre-approved credentials, receiving, processing and implementing camera control commands from the second-system client.

16. A non-transitory carrier medium for carrying computer executable code that, when executed on a processor, allows the processor to perform a method according to claim 6.

17. A system configured for performing a method according to claim 6.

18. A distributed Digital Video Management (DVM) system comprising:

a first DVM system including one or more first-system cameras, one or more first-system camera servers, each having a respective one or more assigned first-system cameras, the first-system camera servers being configured to make available video data from their respective one or more assigned first-system cameras to DVM clients, a first-system DVM database server that maintains data indicative of the first-system cameras and first-system camera servers, and one or more first-system clients for displaying video data to users;

a second DVM system including one or more second-system cameras, one or more second-system camera servers, each having a respective one or more assigned second-system cameras, the second-system camera servers being configured to make available video data from their respective one or more assigned second-system cameras to DVM clients, a second-system DVM database server that maintains data indicative of the second-system cameras and second-system camera servers, and one or more second-system clients for displaying video data to users; and wherein the first DVM system and second DVM system each execute a respective DSA event engine, wherein the first-system DSA event engine is configured to:

monitor object model events in the first DVM system;

for predefined categories of monitored object model events, define DSA transportable data indicative of those events, and communicate the DSA transportable data to the second DVM system; and receive DSA transportable data from the second DVM system, and process that data thereby to publish a local object model event based on a second-system object model event based upon which the received DSA transportable data is defined.

19. A system according to claim 18 wherein:
the first-system DVM database server and second system DVM database server are in communication for sharing data indicative of the cameras and camera servers; and
a first-system client is in communication with a second-system camera server for displaying via the first-system client live video data made available by the second-system camera server.

\* \* \* \* \*